US007893556B1

(12) United States Patent
Ryznic et al.

(10) Patent No.: US 7,893,556 B1
(45) Date of Patent: Feb. 22, 2011

(54) VERTICAL AXIS WIND TURBINE WITH DIRECT DRIVE GENERATOR

(75) Inventors: John E Ryznic, Palm Beach Gardens, FL (US); Joseph D Brostmeyer, Jupiter, FL (US); Jack W Wilson, Jr., Palm Beach Gardens, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 12/780,967

(22) Filed: May 17, 2010

Related U.S. Application Data

(63) Continuation of application No. 12/613,305, filed on Nov. 5, 2009, now Pat. No. 7,750,492.

(51) Int. Cl.
*F03D 3/04* (2006.01)
(52) U.S. Cl. .............................. 290/55; 290/54; 290/44
(58) Field of Classification Search .................. 290/43, 290/44, 54, 55; 415/60
See application file for complete search history.

(56) References Cited

U.S. PATENT DOCUMENTS

| | | | |
|---|---|---|---|
| 1,181,988 A | 5/1916 | Breitung | |
| 1,894,357 A | 1/1933 | Manikowske et al. | |
| 2,153,523 A | 4/1939 | Roberts et al. | |
| 2,177,801 A | 10/1939 | Erren | |
| 2,237,857 A | 4/1941 | Winderl | |
| 3,697,765 A | 10/1972 | Carini | |
| 3,912,937 A | 10/1975 | Lesser | |
| 3,988,592 A | 10/1976 | Porter | |
| 4,061,926 A | 12/1977 | Peed | |
| 4,292,540 A * | 9/1981 | Thompson et al. | 290/55 |
| 4,508,972 A | 4/1985 | Willmouth | |
| 5,760,515 A | 6/1998 | Burns | |
| 6,127,739 A | 10/2000 | Appa | |
| 6,261,138 B1 | 7/2001 | Imura | |
| 6,294,844 B1 | 9/2001 | Lagerwey | |
| 6,448,669 B1 * | 9/2002 | Elder | 290/54 |
| 6,734,576 B2 | 5/2004 | Pacheco | |
| 6,840,738 B1 * | 1/2005 | Swanberg | 416/17 |
| 6,853,096 B1 | 2/2005 | Yu et al. | |
| 6,902,447 B1 | 6/2005 | Pittman | |
| 6,984,899 B1 * | 1/2006 | Rice | 290/44 |
| 7,075,189 B2 * | 7/2006 | Heronemus et al. | 290/44 |
| 7,235,893 B2 | 6/2007 | Platt | |
| 7,314,346 B2 | 1/2008 | Vanderhye et al. | |
| 7,329,961 B2 | 2/2008 | Marchetti | |
| 7,348,686 B2 | 3/2008 | Fielder | |
| 7,397,144 B1 * | 7/2008 | Brostmeyer et al. | 290/53 |
| 7,633,177 B2 | 12/2009 | Platt | |
| 7,681,512 B2 | 3/2010 | Dunn | |

(Continued)

*Primary Examiner*—Nicholas Ponomarenko
(74) *Attorney, Agent, or Firm*—John Ryznic

(57) ABSTRACT

A bearingless floating wind turbine has a tall narrow main support structure with a center of buoyancy located well above the center of gravity to provide stability to the wind turbine while supported for rotation in a body of water, a vertical axis turbine blade extends from the main support structure and rotates together under a wind, and a non-rotating shaft extends through the main support structure with a vertical axis direct drive generator connected between the main support structure and the non-rotating shaft to produce electricity when the main support structure rotates. An anchor line connected to the non-rotating shaft prevents the floating wind turbine from drifting in a body of water.

10 Claims, 2 Drawing Sheets

U.S. PATENT DOCUMENTS

| | | |
|---|---|---|
| 7,750,492 B1 * | 7/2010 | Ryznic et al. ............ 290/54 |
| 7,791,214 B2 * | 9/2010 | Hill ........................ 290/54 |
| 2003/0146627 A1 | 8/2003 | Parviainen |
| 2005/0134050 A1 | 6/2005 | Salls, Jr. |
| 2006/0232075 A1 | 10/2006 | Fraenkel |

* cited by examiner

VERTICAL AXIS WIND TURBINE WITH DIRECT DRIVE GENERATOR

CROSS-REFERENCE TO RELATED APPLICATIONS

This application is a continuation of U.S. patent application Ser. No. 12/613,305 filed on Nov. 5, 2009 and entitled BEARINGLESS FLOATING WIND TURBINE.

FEDERAL RESEARCH STATEMENT

None.

BACKGROUND OF THE INVENTION

1. Field of the Invention

The present invention relates generally to wind turbine, and more specifically to a large floating wind turbine without bearings and without a gearbox between the turbine and the generator.

2. Description of the Related Art Including Information Disclosed under 37 CFR 1.97 and 1.98

Wind turbines are used to convert wind into electric energy by using the wind to drive a rotor shaft shat is connected to a generator fro producing electricity. Horizontal axis wind turbines are being used on land and even offshore in shallow and deep water (over 180 feet) to produce electricity from the wind. A horizontal axis wind turbine is the most popular wind turbine at the time and typically includes three large blades that extend from a rotor hub that is directly connected to the rotor shaft of the turbine. The rotor shaft is connected to a generator through a gear box to step up the rotation from around 29 rpm for the propeller rotor to around 1,200 rpm for the electric generator. All of this is contained within a nacelle structure that is encloses the power train and is supported on top of a large tower than is longer than the length of the blades.

One major problem with these horizontal axis bladed wind turbine is that the gear box used to step up the rotations for use with the generator does not last very long. The gear box is the main limiting factor for the life of the horizontal axis wind turbine.

Another problem with the horizontal axis wind turbines is that the generator and the gear box must be located at high elevations in the nacelle structure which is on top of the tower. Access to the power train requires getting parts and people up to the top of the tower.

Another major problem with these horizontal axis wind turbine is that the blades must be supported on the rotor shaft by large bearings. Currently, most horizontal axis bladed wind turbines are less than 2.5 MW in power because of the structural limits of securing the long and heavy blades to the rotor hub. Turbines of larger power production have been proposed, such as 5 MW horizontal axis bladed wind turbines. However, the size of the blades is so heavy that the bearings cannot support this load for very long and these turbines wear out very fact. Thus, smaller wind turbines in the range of 1.5 MW to 2.5 MW are used mostly because they can operate for longer periods of time.

Wind turbines are now being used offshore where the wind speed is greater and more sustainable than on land. However, the offshore wind turbine must be supported in the water and therefore the cost of installing and operating these offshore wind turbines is much greater than the land turbines. The wind offshore is greater in the deep water regions of greater than 180 feet depths. Offshore wind turbines in the deep waters must be supported on a floating platform that is typically anchored to the ocean floor through three or more cables. A regular land wind turbine is secured onto the floating platform to supply the power to drive the generator. Again, as in the land wind turbine limitations, because of the bearings and the generator, these offshore wind turbines are typically limited to 1.5 MW or 2.5 Mw sizes.

One large wind turbine, which of U.S. Pat. No. 6,294,844 issued to Lagerwey on Sep. 9, 2001 shows a floating platform such as a barge or ship that supports a structure, the structure supporting a plurality of wind airfoils. The Lagerwey invention does not use a large wind airfoil, but makes use of a number of smaller airfoils. And additional embodiment shown in FIGS. 15A and 15B shows a vertical wind turbine rotatably supported by a floating ship. In this embodiment, bearings are used to support the rotating turbine, and therefore the size and weight of the rotating turbine is limited.

Another type of floating wind turbine is disclosed in U.S. Pat. No. 3,988,592 issued to Porter on Oct. 26, 1976, and discloses a floating sphere anchored to a sea bed, the sphere carrying a vertical axis wind turbine. The turbine is small and supported for rotation by bearings. As in the above mentioned Lagerwey invention, the invention of Porter is limited as to the size of the wind turbine because of the use of the bearings for rotational support.

Some prior art inventions make use of a floating turbine in which the turbine is located within the water. U.S. Pat. No. 6,734,576 issued to Pacheco on May 11, 2004 discloses in one embodiment a floating generator in which the rotary structure is completely submerged within the water flow path. The structure is supported by a floating barge.

U.S. Pat. No. 7,397,144 issued to the two applicants of the present invention on Jul. 8, 2008 and entitled BEARINGLESS FLOATING WIND TURBINE shows a floating wind turbine with a very large base diameter in order to make the floating wind turbine stable in the water. The barge is ring torus in shape in order to reduce the viscous drag from the barge rotating within the water. However, the barge requires a large surface area of contact in the water for stability.

There is a need in the art for a larger rotation device that can capture a large amount of wind to generate a large amount of electric power. There is also a need in the art of offshore wind turbines to eliminate the need for a gear box to drive the electric generator. There is also a need to eliminate the use of bearings to support the large rotor blades. There is also a need to eliminate the use of a tower that supports the power train of the wind turbine.

BRIEF SUMMARY OF THE INVENTION

It is an object of the present invention to provide for a large wind turbine that does not require bearings to support the main airfoil structure.

It is another object of the present invention to provide for a floating wind turbine that does not require a gear box.

It is another object of the present invention to provide for a large wind turbine that will allow the use of a large diameter direct drive generator with the wind turbine.

It is another object of the present invention to provide for a large wind turbine in which the drive train is located at the base of the wind turbine instead of at the top of a tower in order to make maintenance and inspections easier.

It is another object of the present invention to provide for a vertical axis floating wind turbine with a method of starting and stopping the turbine from rotating.

The above objectives and more are achieved with the bearing floating wind turbine of the present invention that uses a Darrieus type rotor with a vertical axis of rotation. The Darrieus rotor is secured to a long and narrow floating structure that rotates along with the blades so that bearings are not required to support the heavy loads. The long and narrow floating structure has a central opening from the top to the bottom in which a long shaft extends and out from the bottom of the floating structure. A vertical axis rare earth permanent electric generator is supported on top of the floating structure and connected to the long shaft is secured to. The long shaft extends out from the bottom of the floating structure and is connected to cables anchored to the ocean floor to prevent the floating wind turbine from drifting and to connect the electric cables from the generator to the undersea cables that carry the electricity to a land station.

The vertical axis rotor blades can be very large and extend up to 1,500 feet above the water surface and generate around 90 MWs of electric power in a level 6 wind. A series of cables connect the blades to prevent the blades from bowing outward due to rotation of the wind turbine in order to add additional support to the vertical axis blades. One or tow loops of vertical axis blades can be used to form a wind turbine with two or four vertical blades that are all connected by a series of cables to add additional support for the wind turbine.

Because of the larger surface area on top of the floating support, a large vertical axis direct driven generator can be supported and operated to produce electricity from the slow rotating wind turbine. Cool water from the sea can also be used to cool the direct drive generator.

The direct-drive generator can be operated as a motor in order to start the vertical axis turbine to rotate, or can be used to stop the vertical axis turbine from rotating in order to perform service to the turbine.

DETAILED DESCRIPTION OF THE INVENTION

Figure 1:
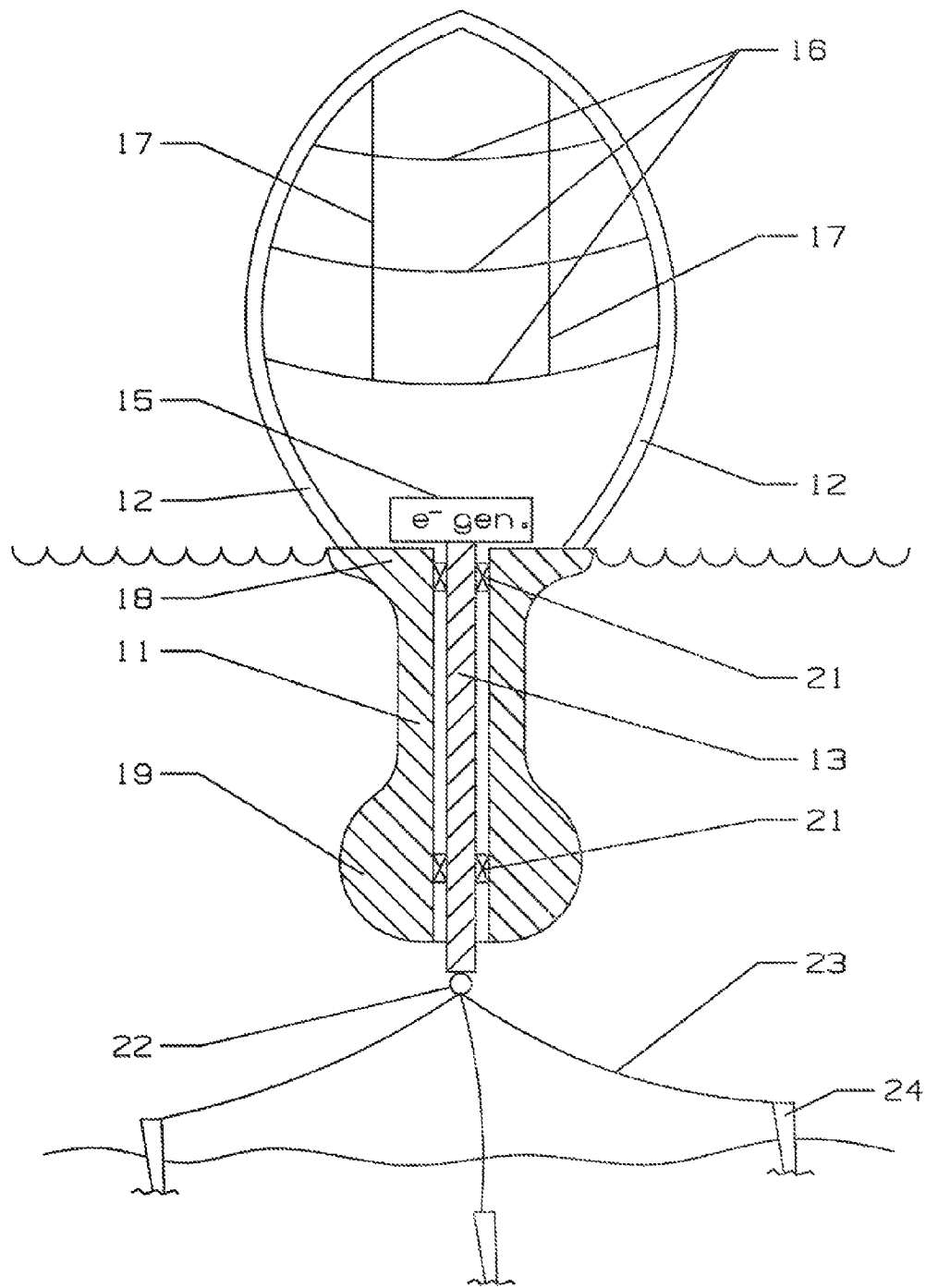
FIG. 1 shows a cross section view of the bearingless floating wind turbine of the present invention using a Darrieus type rotor.

The present invention is a bearing-less floating wind turbine that uses a Darrieus or a Cyclogiro type rotor to extract energy from wind and drive en electric generator to produce electrical power. One of the main features of the present invention over the previous patented invention of the applicant's is the higher stability and lower viscous drag from the use of a tall but narrow floating structure on which the rotor blades are secured. FIG. 1 shows a first embodiment of the present invention and includes a main support structure 11 with a hollow interior that floats in the body of water and supports the entire wind turbine. The main support structure is tall and narrow with an enlarged top portion 18 on the top end and on the bubble shaped bottom end 19 at the bottom end to produce a high level of stability as the structure floats in the water and a reduced surface area in which viscous drag from rotating in the water would occur. The enlarged top end 18 provides for a surface area submerged within the water top form a buoyancy surface to add to the stability of the floating structure and prevent the structure from tipping over due to high wind speed. The enlarged bottom end 19 has a bubble shape to also add to the stability of the structure. The main support structure is hollow so as to float upright in the body of water with the water surface level just below the top of the enlarged top end 18 so as to prevent the blades from tipping over or beyond a certain angle in which the wind turbine would becomes unstable or not work efficiently. The size and shape of the main support provides for the center of gravity CG to be below the center of buoyancy CB of the wind turbine in order to produce a stable structure floating within the water. The water surface should come up to just underneath the top of the enlarged top end 18 for a maximum stability. In another embodiment, the floating support structure could be a long vertical cylinder that would float in the water with a small section of the top above the water surface. This embodiment would be less stable than the embodiment having the enlarged top section and bubble bottom section between the long narrow neck or middle section.

The first embodiment of the present invention is a Darrieus type rotor with two full airfoil hoops extending form the main support structure 11 to form the Darrieus type rotor blade. FIG. 1 shows a single rotor blade with two airfoils 12 but the actual wind turbine includes two full hoops of rotor blades 12 each offset so that the four blades 12 are around 90 degrees from adjacent blades. The rotor blades have an airfoil cross sectional shape and are secured to the floating main support structure upper surface 18 so that the main support structure 11 and the rotor blades rotate together. An outer diameter of the main rotor blades 12 is about 3 times the width of the enlarged top end 18. The turbine main rotor blades 12 are spaced such that the outer diameter of the blades will rotate with respect to the wind at around 100 mph.

The main support structure 11 includes a central passage that extends from the top surface to the bottom of the lower end 19 so that a second or inner shaft 13 can extend through. An electric generator 15 is secured to the top enlarged end 18 and to the upper end of the inner shaft 13 so that electricity will be generated when the relative rotation exists between the main support structure 11 and the long rotor shaft 13. The long rotor shaft 13 extends out from the bottom end 19 so that a number of cables can be attached to anchor the floating wind turbine to the sea floor. To add additional support for the floating wind turbine, the bottom of the floating main support 19 can be filled with ballast such as rocks or gravel.

A number of bearings 21 are used between the inner shaft 13 and the central passage of the main support structure 11 to allow for smooth rotation between these two members. With this arrangement, the electric generator 15 can be located outside of the body of water so that a limited sealing is required to protect the generator from the water and salt while allowing fins to extend from the one shaft (inner shaft 13) and into the body of water to allow for relative rotation between the main support structure 11 and the other shaft (inner shaft 13) connected to the generator 15. The term bearingless floating wind turbine means that the blades of the turbine are not supported by bearings.

Because of the large surface area on the top of the enlarged top section 18 of the floating support structure 11, a large direct drive vertical axis generator can be used. The direct drive generator can be one of the types currently known that uses rare earth permanent magnets and has a diameter of up to 30 feet. A direct drive generator requires a high pole count because of the slow rotation, but eliminates the complexity of a gear box. The generator is secured to the top section and connected to the long rotor shaft 13 that is non-rotating to generate electricity when the floating turbine rotates. An Enercon 1.5 MW direct-drive generator using rare earth permanent magnets uses 56 poles and is only 12 feet in diameter. Another has a 30 foot diameter for a wound rotor design.

The vertical axis turbine can be started in rotation by operating the direct drive generator as an electric motor to start rotating the turbine. Also, the generator can be used as a motor to slow down or even stop the turbine from rotating. When service personnel must board the floating turbine for inspection or repairs, the turbine must be stopped. Thus, the generator can be operated in reverse to start and slow or stop the turbine. An additional device that can be used to stop or slow the rotating turbine is with the use of gates or doors that open outward from the floating main structure and located below the water surface such that water will be directed from the gates and into an internal passage that would direct the water upwards and discharge the water over the side in order to use this water pumping force as a reaction force to slow the rotation of the floating turbine. A series of doors and passages can be spaced around the perimeter of the floating main structure so that several of these gates and passages can be sued simultaneously to create a resistant force and slow the rotating turbine. The doors and passages would be symmetrically located around the floating main structure so that the resulting force is balanced.

To start the floating turbine from stop, the water passages described above can include a propeller driven by a motor that will operate like a boat engine and force water through these passages and out the gates to produce a propelling force using the water that will be directed to start turning the floating main structure. The water passages would be directed top suck in water from the outside of the floating main structure and then out from the angled passage through the gates or doors. The starting and stopping operation can be controlled remotely from the shore using the electrical power lines to carry the power to drive the motor and to carry control signals for the operation. Or, a remote controlled can be used from a boat located beside the floating turbine to control the operations.

In another embodiment, a series of generators can be stacked so that a different resistance force can be developed to control the speed of rotation of the turbine. One generator with a resistance element can be used to convert the electric energy produced into heat to act as a resistant force to slow or stop the turbine rotation. One set of generators would be used to produce electricity while another set of generators can be used to produce resistance and slow or stop the turbine.

It is anticipated that the height of the airfoils will be 1,000 to 1,500 feet above the water level. Thus, retaining cables extend across from one blade to the other to keep the blades from bowing outward. A number of horizontal cables 16 connect one airfoil to the other on the opposite side, and a number of vertical cables 17 extend from the airfoil and support the horizontal cables 16. With four airfoils secured to the upper section 18 and offset at 90 degrees, the horizontal cables will cross at 90 degrees to form a rectangular array. The horizontal extending cables 16 are spaced at around 117 to 214 feet apart and are made of Kevlar fiber with a diameter of around 2 inches for light weight and high strength.

A hook is secured to the bottom end 19 of the long shaft 13 sop that a cable can be connected to the floating wind turbine to secure the wind turbine to the water floor. In the present embodiment, three cables 23 are attached to the bottom of the long shaft 13 on one end and to anchors to the ocean floor on the other end of the cables.

Figure 2:
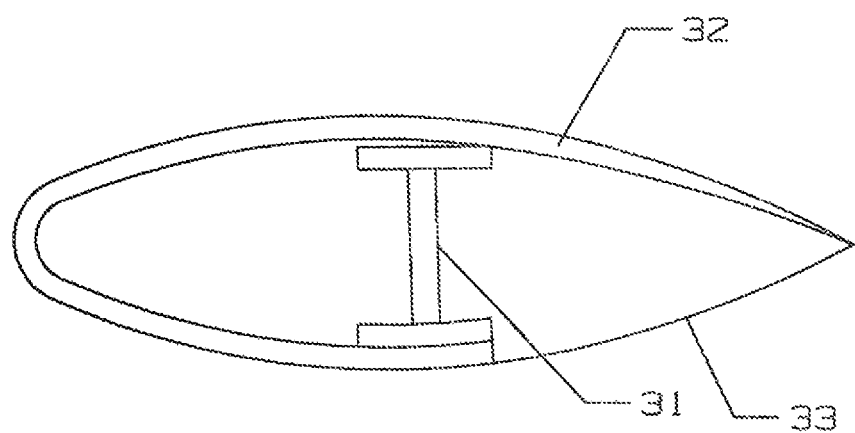
FIG. 2 shows a cross section of the airfoil used in the vertical axis wind turbine of the present invention.

FIG. 2 shows a cross section view of the airfoil used in the vertical axis wind turbine of FIG. 1. A carbon composite I-beam 31 is used to provide the main support structure for the airfoil. An airfoil skin 32 of carbon composite material is wrapped around the I-beam to form a Fogleman shaped airfoil. A thin cover sheet 33 is placed over the open bottom aft end of the airfoil to form an enclosed airfoil with two airfoil surfaces on the top and bottom both extending from the leading edge to the trailing edge. The airfoil is around 15 feet from leading edge to trailing edge, and the thickness of the carbon composite airfoil surface is around 0.5 inches with the I-beam at around 15 inches in height. This structure will result in a light-weight for the tall wind turbine of the present invention.

We claim the following:

1. A bearingless floating wind turbine comprising:
   a plurality of vertical axis blades secured to rotate along with a main support structure;
   a vertical axis direct drive electric generator secured to the main support structure;
   a non-rotating shaft extending from the main support structure;
   the non-rotating shaft connected to the vertical axis direct drive electric generator so that rotation of the vertical axis blades and the main support structure will produce electricity.

2. The bearingless floating wind turbine of claim 1, and further comprising:
   the direct drive generator is a permanent magnetic electric generator.

3. The bearingless floating wind turbine of claim 1, and further comprising:
   the vertical axis turbine blades each comprises a rigid I-beam and an airfoil surface secured to the rigid I-beam.

4. The bearingless floating wind turbine of claim 1, and further comprising:
   the vertical axis turbine blade has a Fogleman airfoil cross sectional shape.

5. The bearingless floating wind turbine of claim 1, and further comprising:
   the main support structure capable of floating in a body of water;
   a passage extending through the main support structure from a top end to a bottom end; and,
   the non-rotating shaft extending through the passage.

6. The bearingless floating wind turbine of claim 5, and further comprising:
   a bottom end of the non-rotating shaft is connected to an anchor line to prevent the floating wind turbine from drifting within a body of water.

7. The bearingless floating wind turbine of claim 5, and further comprising:
   the non-rotating shaft is a hollow shaft; and,
   an electric line that carries electricity generated by the electric generator passes through the non-rotating shaft.

8. The bearingless floating wind turbine of claim 5, and further comprising:
   the main floating support comprises a narrow middle section, a wide top section and a rounded bottom section such that a center of buoyancy is located above a center of gravity for the floating wind turbine.

9. The bearingless floating wind turbine of claim 1, and further comprising:
   the blades are a Darrieus type rotor blades; and,
   a horizontal cable connects opposed blades to support the blades from deflecting.

10. The bearingless floating wind turbine of claim 9, and further comprising:
    a vertical cable extending from a blade and connected to the horizontal cable to support the vertical cable.

* * * * *